United States Patent [19]

Sterett et al.

[11] Patent Number: 5,669,433

[45] Date of Patent: *Sep. 23, 1997

[54] METHOD FOR CREATING A FREE-FORM METAL THREE-DIMENSIONAL ARTICLE USING A LAYER-BY-LAYER DEPOSITION OF A MOLTEN METAL

[75] Inventors: Robert A. Sterett, Jackson; Atul M. Sudhalkar, Ann Arbor, both of Mich.

[73] Assignee: Aeroquip Corporation, Maumee, Ohio

[*] Notice: The term of this patent shall not extend beyond the expiration date of Pat. No. 5,617,911.

[21] Appl. No.: 526,070

[22] Filed: Sep. 8, 1995

[51] Int. Cl.$^6$ .................... B23D 23/00; B23D 27/02; C21C 1/00

[52] U.S. Cl. .................... 164/46; 164/66.1; 164/94; 164/48; 266/202

[58] Field of Search .................... 264/9; 118/669, 118/686, 687; 425/6, 174.2, 174.8 R, 375; 164/46, 4.1, 457, 45, 271, 155.1, 900, 66.1, 94, 48; 266/202

[56] References Cited

U.S. PATENT DOCUMENTS

| | | | |
|---|---|---|---|
| 3,579,721 | 5/1971 | Kaltenbach | 264/9 |
| 4,133,854 | 1/1979 | Hendricks | 264/10 |
| 4,151,014 | 4/1979 | Charschan et al. | 148/13 |
| 4,302,166 | 11/1981 | Fulwyler et al. | 425/6 |
| 4,346,387 | 8/1982 | Hertz | 346/1.1 |
| 4,762,553 | 8/1988 | Savage et al. | 75/0.5 |
| 4,762,975 | 8/1988 | Mahoney et al. | 219/69 |
| 4,795,330 | 1/1989 | Noakes et al. | 425/6 |
| 4,925,708 | 5/1990 | Waters et al. | 428/1 |
| 4,929,400 | 5/1990 | Rembaum et al. | 264/10 |
| 4,981,425 | 1/1991 | Lierke et al. | 425/6 |
| 4,981,625 | 1/1991 | Rhim et al. | 264/13 |
| 4,988,464 | 1/1991 | Riley | 264/12 |
| 5,015,424 | 5/1991 | Smalley | 264/22 |
| 5,032,172 | 7/1991 | Overfelt et al. | 75/255 |
| 5,049,404 | 9/1991 | Kisler et al. | 427/30 |
| 5,053,090 | 10/1991 | Beaman et al. | 156/62.2 |
| 5,054,539 | 10/1991 | Keutgen et al. | 164/457 |
| 5,076,869 | 12/1991 | Bourell et al. | 156/62.2 |
| 5,126,165 | 6/1992 | Akihama et al. | 427/53.1 |
| 5,139,824 | 8/1992 | Liburdi et al. | 427/252 |
| 5,140,937 | 8/1992 | Yamane et al. | 118/695 |
| 5,143,139 | 9/1992 | Leatham et al. | 164/46 |
| 5,147,448 | 9/1992 | Roberts et al. | 75/331 |
| 5,155,321 | 10/1992 | Grube et al. | 219/121.6 |
| 5,155,324 | 10/1992 | Deckard et al. | 219/121.64 |
| 5,171,360 | 12/1992 | Orme et al. | 75/331 |

(List continued on next page.)

FOREIGN PATENT DOCUMENTS

| | | |
|---|---|---|
| 1191706 | 8/1989 | Japan . |
| 1682039 | 10/1991 | U.S.S.R. . |

OTHER PUBLICATIONS

IBM Tech Disclosure Bull., "Magnetic Coil Droplet Sensitizer For Electrostatic Droplet Deflection" by Findlay et al., vol. 16, No. 3 (Aug. 1973).

R.W. Evans, A.G. Leatha and R.G. Brooks, The Osprey Preform Process, 1985, Powder Metallurgy, vol. 28, No. 1, p. 13.

(List continued on next page.)

Primary Examiner—Joseph J. Hail, III
Assistant Examiner—I.-H. Lin
Attorney, Agent, or Firm—Emch, Schaffer, Schaub & Porcello Co., L.P.A.

[57] ABSTRACT

A method for the accurate formation of a three-dimensional article comprises providing a supply of substantially uniform size droplets of a desired material wherein each droplet has a positive or negative charge. The supply of droplets is focused or aligned into a narrow stream by passing the droplets through or adjacent an alignment mechanism which repels each droplet toward an axis extending through the alignment mechanism. The droplets are deposited in a predetermined pattern at a predetermined rate onto a target to form the three-dimensional article without the use of a mold of the shape of the three-dimensional article.

10 Claims, 8 Drawing Sheets

U.S. PATENT DOCUMENTS

| | | | |
|---|---|---|---|
| 5,176,874 | 1/1993 | Mourer et al. | 266/80 |
| 5,182,055 | 1/1993 | Allison et al. | 264/22 |
| 5,182,715 | 1/1993 | Vorgitch et al. | 364/474.24 |
| 5,217,653 | 6/1993 | Mashinsky et al. | 264/22 |
| 5,226,948 | 7/1993 | Orme et al. | 75/331 |
| 5,236,637 | 8/1993 | Hull | 264/22 |
| 5,256,340 | 10/1993 | Allison et al. | 264/22 |
| 5,257,657 | 11/1993 | Gore | 164/46 |
| 5,259,593 | 11/1993 | Orme et al. | 266/78 |
| 5,266,098 | 11/1993 | Chun et al. | 75/335 |
| 5,281,789 | 1/1994 | Merz et al. | 219/76.15 |
| 5,286,573 | 2/1994 | Prinz et al. | 428/457 |
| 5,292,594 | 3/1994 | Liburdi et al. | 428/650 |
| 5,296,062 | 3/1994 | Bourell et al. | 156/62.2 |
| 5,301,415 | 4/1994 | Prinz et al. | 29/458 |
| 5,301,863 | 4/1994 | Prinz et al. | 228/33 |
| 5,312,509 | 5/1994 | Eschbach | 156/345 |
| 5,320,908 | 6/1994 | Sodervall et al. | 428/461 |
| 5,340,090 | 8/1994 | Orme et al. | 266/202 |
| 5,344,298 | 9/1994 | Hull | 425/135 |
| 5,352,405 | 10/1994 | Beaman et al. | 419/45 |
| 5,365,996 | 11/1994 | Crook | 164/45 |
| 5,382,308 | 1/1995 | Bourell et al. | 156/62.2 |
| 5,398,193 | 3/1995 | deAngelis | 364/468 |
| 5,520,715 | 5/1996 | Oeftering | 75/335 |
| 5,560,543 | 10/1996 | Smith et al. | |

OTHER PUBLICATIONS

A.R.E. Singer, Recent Developments in the Spray Forming of Metals, 1985, The National Journal of Powder Metallurgy & Powder Technology, vol. 21, No. 3, pp. 219–234.

E.P. Muntz and Melissa Dixon, Applications to Space Operations of Free–Flying Controlled Streams of Liquids, 1986, J. Spacecraft, vol. 23, No. 4, Jul.–Aug. 1986, pp. 411–419.

E.P. Muntz and Melissa Dixon, Applications to Space Operations of Free–Flying Controlled Streams of Liquids, 1985, AIAA 20th Thermophysics Conference, p. 1.

M. Orme and E.P. Muntz, New Technique for Producing Highly Uniform Droplet Streams Over an Extended Range of Disturbance Wavenumbers, 1987, Rev. Sci. Instrum., vol. 58. No. 2, Feb. 1987, pp. 279–284.

Ross Gunn, Collision Characteristics of Freely Falling Water Drops, 1965, Science, vol. 150, No. 3697, 5 Nov. 1965, pp. 695–701.

Donald G. Roth and Arnold J. Kelly, Analysis of the Disruption of Evaporating Charged Droplets, 1983, IEEE Transactions on Industry Applications, vol. 1A–19, No. 5, Sep./Oct. 1983, pp. 771–775.

V.A. Pogodaev and A.E. Rozhdestvenskii, Disruption and Optical Breakdown in Weakly Absorbing Aqueous Aerosols in an Intense Light Field, 1983, Sov. Phys. Tech. Phys., vol. 28, No. 8, Aug. 1983, pp. 948–951.

P.I. Singh and C.J. Knight, Pulsed Laser–Induced Shattering of Water Drops, 1979, AIAA Journal, vol. 18, No. 1, Article No. 78–1218R, pp. 96–100.

K. Anders and A. Frohn, Experimental Investigation of Droplet Evaporation in a Wide Knudsen Number Range, pp. 975–982.

Shi–Xiong Qian, Judith B. Snow, Huey–Ming Tzeng and Richard K. Chang, Lasing Droplets: Highlighting the Liquid–Air Interface by Laser Emission, 1986, Science, vol. 231, Jan. 1986, pp. 486–488.

Stanley F. Simpson, James R. Kloch, F. James , Microdroplet Mixing for Rapid Reaction Kinetics with Raman Spectrometric Detection, 1983, Anal. Chem 1983, vol. 55, pp. 1420–1422.

A.T. Mattick and A. Hertzberg, The Liquid Droplet Radiator—An Ultralightweight Heat Rejection System for Efficient Energy Conversion in Space, 1982, Acta Astronautica, vol. 9, No. 3, pp. 165–172.

Melissa Emily Orme Dixon, A Study of the Formation and Propagation of Ultra–Coherent Droplet Streams in a Vacuum, 1985, Thesis presented to the Faculty of the School of Engineering, University of Southern California, Dec. 1985.

Melissa Orme, Terence G. Langdon and E.P. Muntz, Materials Synthesis and Processing: A Novel Technique of Net–Form Materials Synthesis, Abstract NSF Grant, Award No. 9396221, Aug. 1993.

Melissa E. Orme, NSF Young Investigator: Advanced Materials Synthesis and Manufacturing Techniques Using Controlled Droplet Deposition, Abstract NSF Grant Award No. 9457205, Sep. 1994.

Melissa E. Orme and Changzheng Huang, Thermal Design Parameters Critical to the Development of Solid Freeform Fabrication of Structural Materials With Controlled Nano–Liter Droplets, 1995, Presented at SFF in Austin, Texas.

Amod A. Ogale and Thierry Renault, An Overview of Rapid Prototyping and Free Form Fabrication Techniques, pp. 25–29.

Godard Karl Abel, Characterization of Droplet Flight Path and Mass Flux in Droplet–Based Manufacturing, 1994, Thesis presented to the Department of Mechanical Engineering at MIT on May 18, 1994.

Christian Henry Passow, A Study of Spray Forming Using Uniform Droplet Sprays, 1992, Thesis presented to the Department of Mechanical Engineering at MIT on May 5, 1992.

METHOD FOR CREATING A FREE-FORM METAL THREE-DIMENSIONAL ARTICLE USING A LAYER-BY-LAYER DEPOSITION OF A MOLTEN METAL

FIELD OF THE INVENTION

The present invention relates generally to a method and apparatus for depositing molten metal in a layer-by-layer process on a target such as a work space platform or a substrate to form a three-dimensional object.

BACKGROUND OF THE INVENTION

Co-pending applications directed to other embodiments of this invention are disclosed in co-pending applications which are owned by the same Assignee herein, Aeroquip Corporation, Ser. Nos. 08/525,925 now abandoned; 08/526,071; 08/525,924 and 08/525,000, filed Sep. 8, 1995 and now issued as U.S. Pat. No. 5,617,911. Various methods have been proposed to form three-dimensional articles by depositing of layers of material on a substrate. This layering manufacturing is also known as solid free-form fabrication or rapid prototyping. A computer model of a desired object is sliced into a finite set of layers. The layers are created sequentially, or bonded onto a previously formed layer. This layering creates an object which approximates the intended geometry of the three-dimensional object, in a much as the layers cause a "staircase effect" at the edge or peripheral area of the object. The staircase effect is an artifact of the process of applying the discrete layers of material. The final appearance of the object can be improved by minimizing the layer thickness or by using such additional processing steps as sand blasting and the like which smooth out the surface of the object.

Stereolithography is one method for forming a three-dimensional polymeric article made of a polymeric material. In stereolithography, a photopolymer is selectively cured using a laser beam to create each layer. The three-dimensional article is built up on an elevator-type platform in a vat containing the liquid photopolymer. Successive layers are created by lowering the partially created objects into the photopolymer liquid and laser curing a new layer of photopolymer material on the top of the partially built object.

Another method comprises a fused-deposition modeling process which melts and extrudes a polymer substance through a nozzle onto a target to form the three-dimensional object.

Still another method involves lamination wherein layers of a paper or polymer material are cut and bonded to the substrate, then trimmed on the edges or peripheries with a laser to correspond to a desired layer or cross-section through the article. The unwanted or waste areas of each layer are cut into a grid. These "squares" stack up to form square prisms, truncated by the boundary of the object. The "square" areas are physically removed after product completion, leaving only the desired part.

Still another method uses a lamination process wherein papers or other mask-type materials are used to build layers of material. A laser beam cuts the layer geometry into the paper which is used as a mask. The material is deposited in the cutout area which defines a single layer of the three-dimensional article and portions of the material overlaps onto the mask material.

In the past, it has been difficult to form three-dimensional articles made of a metal by using a free-form fabrication or deposition layering process.

One metal fabrication method involves a laser sintering process which spreads a layer of a metal powder material on top of partial objects and then selectively sinters (using a laser beam) the portion which comprises the new layer.

Another metal fabrication method involves a post sintering process wherein metal powder materials are bonded together with a polymer binding material. However, it is difficult to entirely remove the polymer binding material from the finished three-dimensional object. The presence of binder residue detracts from the desired strength and other properties of the metal object. In addition, removal of the polymer material causes voids in the three-dimensional object such that the object is somewhat porous. Another metal material (such as a lower temperature metal) can be infiltrated into the porous three-dimensional object with temperature differentiation, in an attempt to fill the voids. However, the three-dimensional object then has a "honeycomb" type composite structure of less than desirable properties and is subject to creeping or warping during sintering of the original host material. In addition, the presence of residual polymer and/or the fill material act as contaminates within the three-dimensional object and thereby affect the properties of the object. The contaminates may include products of oxidation, excess carbon, binder residue and the like. It is to be understood that the use of filling or fiber elements in the infiltration process is different from the use of alloy materials. In infiltration the two materials remain distinct; whereas, in an alloy the materials are homogeneously blended together to achieve a desirable combination of properties. Another concern is that whenever the infiltrated material bonds imperfectly with the matrix material, the microstructure has a very large number of stress concentrators, thereby reducing the strength of the object. While such three-dimensional "infiltrated" objects are sometimes called "fully dense" objects, such a term is misdescriptive of the actual characteristics of the three-dimensional object since the three-dimensional object is not comprised of substantially one type of a preferred metal.

Still other fabrication methods use metal deposition techniques in conjunction with a metal removal technique such as milling, grinding, sand blasting and the like. The "staircase" effect and the roughness at the edge of each layer are eliminated by machining each layer and its peripheries after the layer is deposited. It is the machining or metal removal process that determines the actual dimensional accuracy of the three-dimensional object.

Currently there are several methods and apparatuses for depositing molten material. For example, the Mertz et al. U.S. Pat. No. 5,281,789 describes a welding process and an apparatus for depositing molten metal. A molten metal is deposited on a work surface and subsequent layers of metal are deposited thereon. An electrode and weld torch are preferably movable as a unit so that the molten metal may be deposited onto selective locations on the work surface. Alternatively, the work surface may be moveable while the weld torch and the collector electrode are moveable or held stationary so as to selectively position the deposited material on the work surface. The droplet size is controlled by applying additional mechanical energy to the feed wire to constantly vibrate the feed metal.

The Prinz et al. U.S. Pat. No. 5,286,573 describes a method using support structures for the creation of objects by a layer deposition process. In the deposition process, each layer is composed of two portions. One portion represents a cross-sectional slice of a three-dimensional object being built ("the object") and is composed of the desired deposition material or materials. The other portion is the complement of the object shape of the first portion and serves as a support structure which supports the growing object form ("the support"). The object material and the support structure material are each applied in a predetermined sequence. A plurality of layers, each placed upon the previous layer, is formed. In this way, a layered structure is built up. The layered structure contains the object made of the deposition material surrounded by the support material. For each layer, both, or one of, or neither of the support material and the object material can be shaped to produce its desired object. Preferably, the shaping occurs after the object or support material is applied and before the subsequent layer is applied.

The Prinz et al. U.S. Pat. No. 5,301,863 describes an automated system having multiple work stations for forming objects by incremental buildup of layers. Each layer a cross-sectional slice of a three-dimensional object being built and is composed of the desired object material. In addition to the object material, each layer usually also contains a second portion that acts as a complement of the object shape of the deposition material portion and serves as a support structure for the growing object form. During the manufacture of the article, several operations are performed on the workpiece for each layer. In addition to the material deposition station, a plurality of processing stations are employed, each of which has at least one separate function. These functions can include any combination of shot peening, cleaning, blasting, heat treating, shaping, inspection, mask making and packaging.

The Prinz et al. U.S. Pat. No. 5,301,415 describes a method for the fabrication of three-dimensional articles by incremental material buildup of layers of material. In one embodiment, a layer of object and support material is applied. Depending on the shape of the object, either one or the other material is applied first, then shaped to achieve dimensional accuracy, and then the other material is deposited. The deposited layer is then machined, cleaned, shot-peened and the like. The process is repeated until all layers have been placed. After the final layer has been applied, the complementary material is removed leaving the created object formed of the deposition material.

The deAngelis U.S. Pat. No. 5,398,193 describes a method and an apparatus for making a three-dimensional object through controlled layer-by-layer deposition and/or extraction. A three-dimensional computer model representation of the three-dimensional part is provided and the model representation is sliced into a plurality of successive layers corresponding to layers of predetermined thicknesses of the part. The computer model generates sequences of the part and any complementary support material contours which correspond to each layer. Materials for one or more contours are deposited onto a work surface within a processing enclosure. Portions of the material are removed from the contours. The deposition processing and removing steps are repeated as necessary under the control of the computer model to complete the three-dimensional object. Further processing includes machining off a sublayer to ensure thickness tolerances or roughening and chemically enhancing the surface to ensure selective binding to the next aggregate layer. The controlled layer creation steps are repeated to build the entire part surrounded by complementary materials which are then removed to obtain a fabricated part.

A major disadvantage of the above methods is that the machining portion of these methods is relied upon to achieve the desired dimensional accuracy of the three-dimensional object. In many situations, the objects being formed require multiple post fabrication steps to produce an acceptable three-dimensional object or end product.

There is a need for an improved method for creating three-dimensional or solid objects which utilizes accurate deposition of the material onto a work surface or substrate. However, until the present invention, there has been no disclosure or suggestion that a supply of droplets could be accurately controlled and dispensed to form a high quality three-dimensional or solid article in a net shape without the use of a collector or mold.

One method for forming a spray of substantially uniform size droplets is disclosed in the Chun et al. U.S. Pat. No. 5,266,098 which describes a process and an apparatus for producing and maintaining charged, uniformly sized metal droplets. The droplets are deposited as a spray to coat a substrate. A droplet generator is disposed within a spray chamber. The droplet generator comprises a container for holding and liquefying a charge of metal, a means for forming uniformly sized metal droplets, and a means for charging the metal droplets as the droplets are formed. The forming means is preferably either a vibrating means for vibrating the molten metal in the container (or at least one oscillating gas jet disposed outside the container at the point where the liquified metal exits the container). The liquified metal is forced from the crucible through an orifice in the container so as to form the metal droplets. As the liquified metal exits at least one orifice as a jet or stream, the imposed vibrations in the liquified metal cause the jet to break up into uniformly sized metal droplets. An electrical charge is applied to the droplets as the droplets are being formed. The metal droplets may be charged by either charging the liquified metal while in the container or by charging the droplets as, or after, the droplets are formed after exiting the crucible. As each droplet breaks from the jet or stream, the droplet retains a portion of the charge. With that charge, the droplets repel each other in flight and scatter into a cone-shape as the droplets fall toward a substrate. When the uniformly sized droplets are charged, the droplets are oriented to form a cone configuration due to the like polarity of the droplets and the repelling of each droplet from its neighboring droplet. The Chun et al. '098 patent further claims the application of an electric field in the flow path of the metal droplets to change their trajectories.

A thesis submitted by C. H. Passow to the Department of Mechanical Engineering at the Massachusetts Institute of Technology (MIT) on May 5, 1992 describes a study of spray forming using uniform droplets sprays, droplet placement production techniques, and droplets selection and deflection wherein parallel plates are positioned below the charging plate to deflect the charged droplets off to the side where they would be collected. Uncharged droplets would pass unhindered.

An article by P. J. Acquaviva et al. entitled *Issues in Application of Thermo Spraying to Melt Mold Fabrication* published in IBEC International, 1994, describes a uniform droplet spray and deposition process which can be manipulated by moving a substrate at various speeds and directions.

A thesis submitted by Godard Karl Abel to the Department of Mechanical Engineering at MIT on May 18, 1994 describes using a uniform droplet spray forming process to form deposits on stationary and moving substrates; the spray forming of three-dimensional parts; and, instead of allowing droplets to scatter randomly based on an unknown disturbance, the droplets could be charged to varying amounts and then deflected to create a more predictable mass flux distribution.

The Orme et al. U.S. Pat. Nos. 5,171,360; 5,226,948; 5,259,593; and 5,340,090 describe methods and apparatuses for forming a net form product by directing a stream of a liquid material onto a collector of the shape of the desired product. A time variable disturbance is applied to the stream to produce a liquid droplet stream with the droplets impacting on the collector and solidifying into a unitary shape. The Orme et al. 1995 paper presented at SFF in Austin, Tex. describes thermal design parameters for the development of solid free-form fabrication of structural materials with controlled droplets.

In view of the need for a better and more efficient method for the manufacturing and forming of three-dimensional solid objects, and as a result of extensive research, a new method for creating a three-dimensional solid object by depositing a molten metal has now been developed.

As far as is known, there is no disclosure that a three-dimensional solid object can be formed by dispensing uniformly sized metal droplets incrementally in layers in a highly accurate manner.

Accordingly, it is an object of the present invention to develop an apparatus and process for manufacturing high quality solid metal objects. The present invention further provides a process which does not involve the use of multiple processing steps to form each layer of deposition, or otherwise achieve dimensional accuracy of the three-dimensional solid object.

BRIEF DESCRIPTION OF THE INVENTION

The present invention provides a highly accurate method and apparatus for incrementally superimposing layers of uniformly sized metal droplets of a desired material (or materials) onto a target or platform to form a three-dimensional solid object. The objects are created rapidly and directly by the controlled deposition of the droplets. The deposition of the droplets into layers is controlled using computer-based models of the object geometry. The solid object is built incrementally using layers created from uniformly-sized droplets. It is the control and application of the individual droplets which provides the solid object with its desired dimensional characteristics.

The method and apparatus of the present invention provide a "fully-dense" three-dimensional solid object which is comprised of a metal or desirable alloy material. In addition, the three-dimensional solid article has a uniform density and has substantially no voids and is not porous. No sintering or infiltrating processes are needed in order to form the fully dense article of the present invention. The solid object formed using the present invention has a homogeneous microstructure. In addition, the article of the present invention is substantially contaminate-free such that the article formed has highly desirable physical characteristics. The article made according to the present invention possesses the desirable physical characteristics and properties which are substantially better than those properties found in articles formed by conventional casting, spraying or molding processes.

The three-dimensional solid object has desirable dimensional tolerances, tensile, fatigue and compressive strengths, ductility, toughness, hardness and wear-resistance characteristics and properties. The solid object has a substantially uniform or homogeneous isotropic content of the material throughout the structure of the three-dimensional article.

The present invention can be utilized internally within a facility in a very rapid and economic fashion to produce metal tooling or products for the customer's production requirements. In addition, the apparatus of the present invention can be built in "table top" size for use in applications which have limited space availability such as submarines or off-shore drilling rigs. Further, it is possible to quickly produce a desired three-dimensional solid object so that the customer need not have costly space-consuming inventories always on hand.

In preferred embodiments, the objects are created using a uniform droplet forming process such as described in the Chun et al. U.S. Pat. No. 5,226,098 wherein the deposition material is supplied into a metal feed system which has a heater for melting the metal. The molten metal is contained in a droplet forming means such as a crucible having at least one orifice which permits passage of the molten metal therethrough. In a preferred embodiment, the orifice has a diameter in a range of about 50 to 500 microns. The molten material is subjected to a pressure differential of about 5–50 psi which forces the molten material through the orifice as a stream. The molten metal is subjected to a certain frequency and/or amplitude such that the liquified metal vibrates. The vibration and metal surface tension causes the controlled break up of the stream of molten metal into uniformly sized droplets as the molten material is dispensed from the orifice. As the droplets are formed, the droplets are subjected to a positive or negative charge. The like charge on the individual droplets keep the droplets separate and prevents the droplets from merging together in flight with neighboring or adjacent droplets, and thus allows the droplets to maintain their uniform size.

The present invention is an improvement over the Chun et al. '098 technology wherein the like charge on the droplets causes the droplets to spread out and to be deposited as a spray. The present invention provides a method for focusing the droplets or aligning the droplets in a narrow stream or single file after their formation rather than allowing the droplets to be spread out into a spray. The present invention also prevents the droplets from merging vertically with each other, thus further maintaining size consistency.

According to the present invention, the supply of droplets is aligned or focused into a substantially narrow stream or line by passing the supply of charged droplets adjacent or through an alignment means. The alignment means adds an additional (electrical) force field by carrying the same charge as the droplets. The alignment means repels the droplets substantially uniformly inward towards an axis extending through the alignment means. The repelling of the droplets inwardly forces the droplets into a fine stream. By repelling the droplets throughout the flight of the droplets, the droplets remain focused in a single file stream or fine line of droplets.

Thus, it is to be further understood that the present invention comprises, in part, a method to align the droplets. In various embodiments, the droplets can be aligned by either maintaining, reducing or increasing the charge on the droplets as the droplets are being dispensed and deposited onto a target or partially formed three-dimensional article.

In one preferred embodiment, the alignment means comprises at least one axisymmetric hollow repelling cylinder or frusto-conical repelling means which is positioned adjacent or close to the target or partially formed article. An axis extending through the alignment means is aligned with the nominal path of the stream of droplets.

The emerging stream of molten material has an electric charge of the same polarity as each droplet. In a preferred embodiment, as the jet stream breaks into droplets, a charge is supplied to each droplet. When the charging means is held at a predetermined voltage with respect to the jet stream, the combination of the voltage and the capacitance between the charging means and the jet stream brings a charge to the leading point of the jet stream. Each droplet retains a charge that the droplet held before it broke free from the jet stream. The charge on the droplet causes each droplet to repel from adjacent droplets which prevents the droplets from merging.

According to the present invention, the charged droplets are maintained in a predetermined narrow line or path by the alignment means. In preferred embodiments, the alignment means maintains the charge, applies a further charge to, or reduces the charge on the descending droplets. The like charge applied to the descending droplets keeps the droplets away from the alignment means and also away from each adjacent droplet. Thus, when the charge on the alignment means is sufficiently great, the droplets will be a uniform distance from each other in the stream and will tend to cluster around an axis extending through the alignment means. The droplets are held in a substantially narrow stream as the droplets pass through or adjacent the alignment means.

It is to be understood that in various embodiments, the alignment means can comprise an additional means for reducing the charge on the descending droplets by supplying, for example, to a stream of positively charged droplets, an electron beam which reduces the charge on the droplets.

In a preferred embodiment, the droplets are supplied onto the target in an enclosed system such that there is less risk of any contamination such as oxidation occurring on the surface of the droplets and therefore within the layers of deposited materials. In one preferred embodiment, the air in the work space is replaced by an inert gas such as argon or nitrogen. When heavy inert gases such as argon are used, the inert gases are preferably introduced at a lower end of the enclosed work space. The heavy inert gases displace the lighter air which can flow out the top of the enclosed work space. In another preferred embodiment, the air in the work space is replaced by a lighter inert gas such as a nitrogen. It is to be understood however, that the type of inert gas depends upon the type of metal being deposited. It is further understood that with deposition of aluminum, it is preferable not to use nitrogen since the nitrogen and aluminum react. It is further understood that in various embodiments, the density differences between the inert gas and the ambient air can be accentuated by, for example, cooling the argon and heating the nitrogen. In a preferred embodiment, the work space is kept under a positive pressure so that any leaks are outward and no ambient air leaks into the enclosed work space. Various containment means for enclosing the work space include a flexible shroud; for example made out of a suitable material such as polyvinylchloride and the like, which is mounted on a metal frame. Other means for enclosing the work space includes a rigid transparent plastic housing made of a suitable material. These containment means may replace the large cumbersome vacuum chambers now in use such that the apparatus of the present invention can be used in a table top design. A vacuum chamber may however be used to obtain desired droplet purity levels and resulting three-dimensional part properties.

In a preferred embodiment, the work environment has an inert atmosphere. It is to be understood that a gas controlled system can be used to force the molten material from the crucible containing the molten material at high pressures of about 20–50 psi ($\approx$140–350 kPa). A further gas controlled system provides a low pressure source at about 1–2 psi to the work environment. It is to be understood that these pressures are gauge pressures i.e., they are higher than atmospheric pressure, are not absolute, and are merely shown for ease of illustration of the present invention. In operation, it is contemplated that if necessary, the work environment can be repeatedly purged by introducing an inert gas to limit oxygen levels. It is to be understood that suitable minimum oxygen levels are determined by measuring the properties of the end products exposed to different contamination levels.

The fine stream or line of droplets is accurately positioned on a target or work station to form the three-dimensional article. It is to be understood that according to the method of the present invention, either the supply of the stream of droplets and/or the target can be moved to form the three-dimensional article. In one embodiment, the target can be moved a predetermined distance in response to the line of droplets being applied to the target. For example, the target can be moved horizontally and/or vertically at a predetermined rate which is dependent, at least in part upon the droplet deposition rate. In certain preferred embodiments the droplet deposition rate can be monitored by a vision/counting system. The three-dimensional article formed on the work station is operatively connected to a positioning system. In a preferred embodiment, the positioning system comprises at least 2–3 axis, and in certain embodiments, a 3 to 5 axis table, drives for the axes, encoding means for receiving and transmitting positional data, and a control system to coordinate motion along the axes. The control means can comprise a computer-based representation of the object geometry which supplies the coordinates and means to interpret movement of the work station. In an alternative embodiment, the droplet forming/supplying means can also be operatively connected to a different positioning means which moves the supply of droplets in about positions between at least the X, Y and Z axes in response to a predetermined pattern. In yet another embodiment both the work station and the supply of droplets can be moved to form the three-dimensional article.

In a preferred embodiment, a planning system, such as a suitable software program accepts a solid-model representation of the three-dimensional object. The planning system sections the object geometry into a finite number of slices and plots the deposition path needed to achieve each layer, including any overhang support requirements (as described in detail below) of the article as a whole. The control system coordinates the planning system, the movement of the droplet forming/supply means, and the work station positioning system. The control system(s) also monitor(s) all sensor inputs which relay information on the various operating parameters and maintains correct operating parameters such as pressures, temperatures, voltages and the like.

According to the present invention, the parameters (such as the pressure, orifice diameter, frequency and amplitude of the vibrations of the droplets) can be varied to change the diameter of the uniformly sized droplets. It is to be understood that the optimum diameter of the droplets depends, in part, upon the three-dimensional articles being formed and upon the type of material being deposited. Other parameters such as the feed rate of the metal into the crucible, crucible pressure, temperature and amount of charge on the droplets also affect the size and rate of formation of the uniformly sized droplets.

Still other parameters include the temperature of the target or article being formed and the state of the droplets as the droplets are deposited on the target or article being formed. The temperature of the droplets and/or target and the drop velocity onto the target determine, in part, the bonding or merging of the droplet into a uniform layer on the target material.

In certain embodiments of the present invention, another parameter which can be varied is the "standoff" distance between the droplet forming means and the work station. This change in the distance affects both the size of the "footprint" or impact area of the droplets and the liquid-to-solid fraction of the droplets. By varying the liquid-to-solid fraction, the bonding qualities of the droplets to the substrate can be changed. It is to be understood that the temperature of the deposition material itself affects the thermal state of the droplets. In certain embodiments, the temperature of the deposition material can vary from just above the melting point, and in other embodiments can be, for example, about 50° C. above the melting point. This difference in temperature of the liquid deposition material will, of course, affect the temperature of the droplets with respect to the distance from the orifice to the target (i.e., "in-flight" or "stand-off" distance).

The droplet is supplied at or about an optimum liquid-to-solid fraction. In various embodiments, the solid-liquid fraction of the droplet as the droplet hits the target is an important variable. The impact of the droplet on the target converts the kinetic energy of the descending droplet into heat energy. This heat remelts the droplet and the target at the point of impact of the droplet. This remelting helps in the bonding process of the droplets to the newly formed surface.

In order to achieve geometric accuracy, the present invention precisely aligns and focuses the droplet stream and carefully correlates the speed or direction of the target movement relative to the placement of the droplet stream and to the flow rate and temperature of the droplet stream. The stream of droplets is controlled for efficiency and accuracy. In a preferred embodiment, a suitable flow measuring system, such as a computer vision system operatively connected to a stroboscopic light source, to estimate the flow rate of the metal by counting the number of droplets which pass a frame in a given time.

The positioning system moves the target according to the geometry of the section or layer of the three-dimensional article or support being created. The speed of motion of the target along a predefined path is governed by the flow rate of the deposition material, as preferably measured by the flow measuring system.

The number of layers and the positioning of the layers forming the three-dimensional article is determined by a number of factors. The object geometry dictates certain points through which a layer must pass; thus, a minimum number of layers are needed in order to form the three-dimensional article. It is to be understood that in various embodiments where a support material is provided, the support material is also being placed adjacent the partially fabricated article. Another factor affecting the object geometry is the maximum thickness of each layer. It is to be understood that each layer can be no thicker than that portion of the article being formed. It is to be further understood that the functional requirements of the end use for the three-dimensional article dictate the surface finish on the three-dimensional article. Thus, the requirement for either a substantially smooth surface finish or a textured finish can also limit the layer thickness. It is to be understood, however, that the present invention provides a method for depositing droplets having a diameter as small as approximately 50 microns such that the three-dimension articles formed have a desirable surface for most end use applications. It is to be further understood that, at the edges or periphery of the article, any staircase effect depends on not only the diameter of the droplet and therefor the impending layer thickness, but also the spread or splash diameter of the droplet as the droplet contacts the surface. In most embodiments, the surface finish of the edges or periphery of the article being formed have highly acceptable surface finishes having minimum staircase effect which is suitable for most end use requirements.

It is to be understood that the actual size of the droplets being deposited depends upon the end use requirements of the three-dimensional article. It is the accurate control of the deposition of the drops and the size of each droplet which allows for the production of three-dimensional solid articles.

According to the method of the present invention, the deposition of material and the control over droplet size is accurate to within fractions of a millimeter. This improvement in the positional accuracy and size of the droplets allows for the building of three-dimensional articles without recourse to intermediate physical models against which to spray metal or to further processing steps. The three-dimensional articles formed according to the present invention are substantially contaminate-free and which can be directly utilized in industrial and commercial applications.

The present invention forms droplets which are deposited in a single operation to form a three-dimensional article. The present invention involves a net-shape process that rapidly produces an accurate, durable three-dimensional article. Both the incremental application and the subsequent solidification of the droplets occur in an accurately controlled manner. The microstructure and the geometry of the article being formed are precisely controlled so that no additional processing steps such as machining are required in order to form the three-dimensional article.

The droplets are supplied having a substantially uniform size, at a preferred velocity, and at a preferred distance from the target such that the droplet temperature and the target temperature are within optimally defined parameters. In particular, the droplets have a preferred diameter and are deposited at a preferred distance such that the liquid-to-solid fraction of the droplet is especially suited for bonding to the three-dimensional article. If the droplet is too cool, the droplet will form a powder-like material and will not bond to the article well. If the droplet is too liquid, then the liquid will flow and cause uneven and uncontrollable surfaces on the three-dimensional article before cooling on the surface of the three-dimensional article. In a preferred embodiment, the liquid-to-solid fraction is approximately 30:70 and the droplets have a substantially uniform size that varies in diameter no more than about ±25% and most preferably no more than about ±5%.

In an especially preferred embodiment, the droplets are formed using an apparatus that forms uniform electrically charged molten metal droplets. The apparatus melts a charge of metal in a crucible and forces the molten metal through a small orifice (45–200 µm) in diameter to form a laminar jet or stream of droplets. The stream is broken by imposing vibrations (preferably from about 5 to 30 kHz) to a piezo-electric transducer to form a stream of uniform droplets. Each droplet is charged by a charging means such as a high voltage plate (about 300 to 400 V) as each droplet breaks from the laminar jet or stream. The droplets are given a charge of the same polarity so that the droplets repel each other so as to stay separate and thus maintain the original size.

In a preferred embodiment, the crucible is kept at a higher pressure than the work space environment to force the liquid metal out through the orifice such that the pressure on the liquid controls the flow of the liquid through the small orifice.

One advantage of the present invention is that, it is now possible to capitalize on the surface tension properties of the deposition metal to build overhang portions of material. The overhang portions comprise layers of droplets which extend beyond the edge of a previous layer to form an overhang structure.

Another advantage of the present invention is that the movement of the target work station can be around 3 to 5 axes. The target can be tilted about axes in addition to the linear movement along or between the X, Y and Z axes. This tilting allows the three-dimensional article to have overhang portions created without supports. For example, the three-dimensional article can be rotated 90° to a position wherein the deposition of the material continues to build vertically, but at a right angle to the earlier deposited material, forming an overhang on the end product after the part is returned to its original positioning.

Another advantage of the present invention is that in certain embodiments, at least two materials can be used wherein one material is a sacrificial support material and the other material is the desired object material. The support material is dispensed adjacent the object material and is to be used only in supporting the overhang portions of the desired object material. The support material is removed upon of the completion of the three-dimensional object by applying heat, oxidizing, solvent, mechanical or other suitable means which are not harmful to the three-dimensional article. The support material can comprise any suitable material such as a lower melting point metal, an alloy, salt, glass, ceramic, graphite or a composite thereof.

Still another advantage of the present invention is that, in certain embodiments, when the distance from the droplets forming means to the target is sufficiently large, a supply of the droplets dispensed from that distance will solidify completely by the time the supply of droplets reaches the target. The supply of droplets which does solidify before reaching the target is, in essence, a supply of powder particles which acts as a support for subsequent layers of the deposition material. The powder, by not having bonded to the article being formed, can be removed upon completion of the three-dimensional article.

Still another advantage of the present invention provides, in certain embodiments, a means for relieving stress in the layers of deposition material. In certain preferred embodiments, a source of laser energy is used to anneal or relieve stress as the layers of material are dispensed to form the three-dimensional article and to control the immediate area surface temperature.

The metal three-dimensional objects formed according to the present invention have desirable characteristics and properties which are substantially equivalent to or better than the properties of cast parts.

BRIEF DESCRIPTION OF THE DRAWINGS

FIG. 4A is a greatly enlarged, side elevational view, partially in cross-section, of the article shown in FIG. 4 being formed.

DESCRIPTION OF THE PREFERRED EMBODIMENTS

Figure 1:
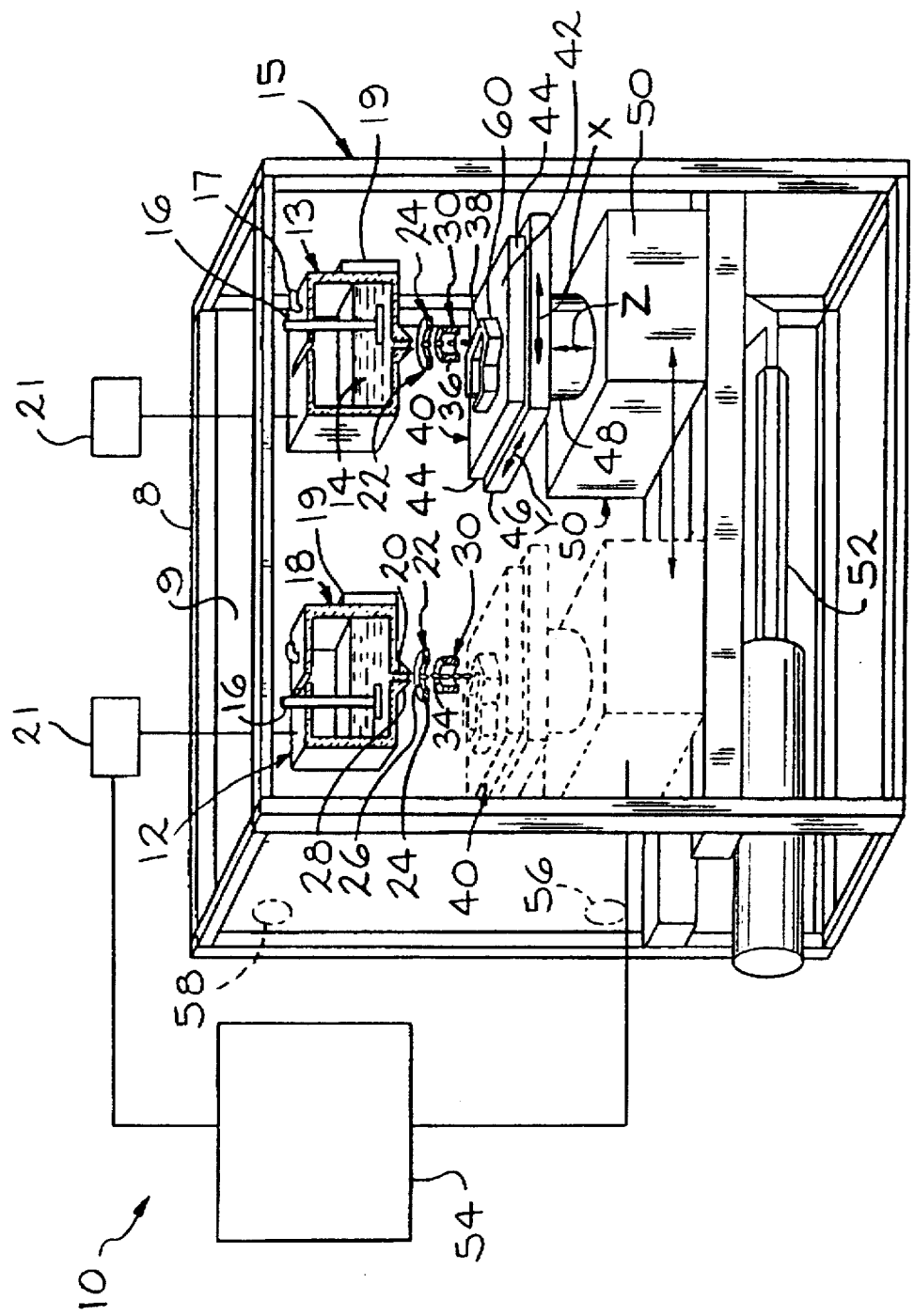
FIG. 1 is a perspective view, partially in cross-section and partially in phantom, of an apparatus for depositing molten material to form a three-dimensional article.
Figure 1A:
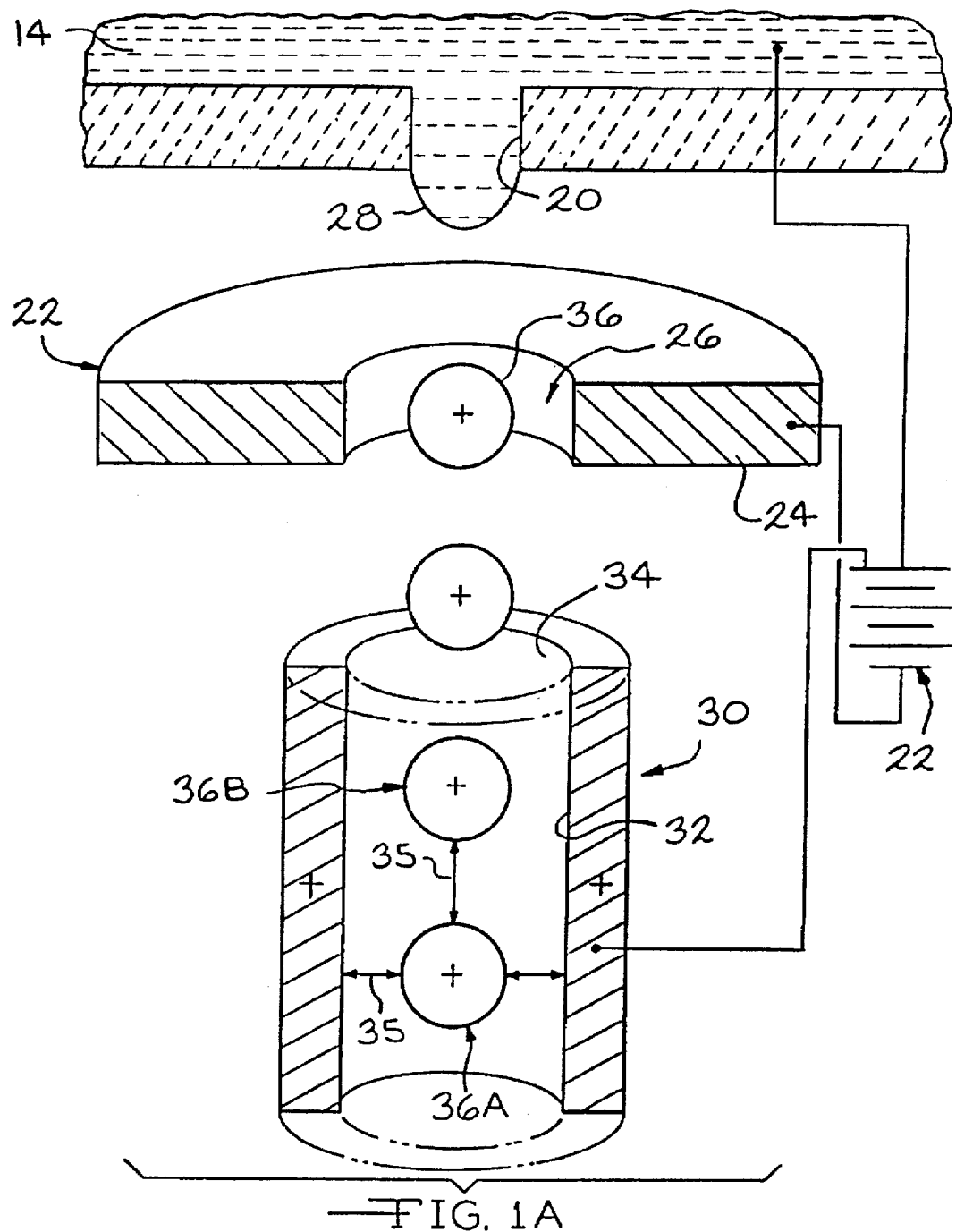
FIG. 1A is a greatly enlarged perspective view, partially in cross-section of a portion of the apparatus shown in FIG. 1.
Figure 1B:
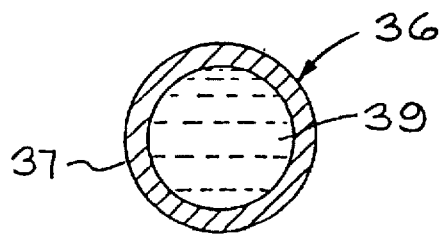
FIG. 1B is a greatly enlarged cross-sectional view of a droplet.
Figure 1C:
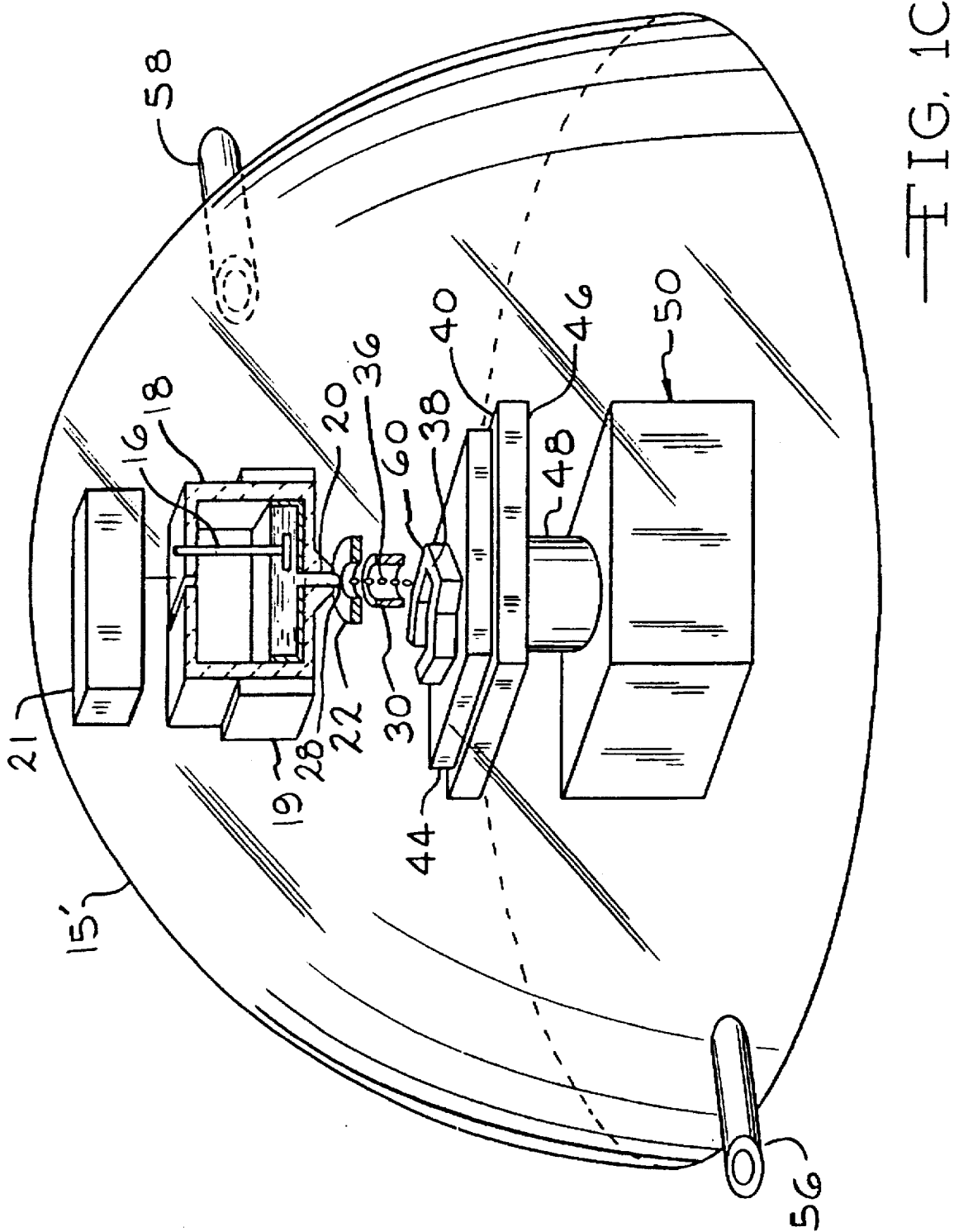
FIG. 1C is a perspective view of another embodiment of an apparatus for depositing molten material to form a three-dimensional article.

Referring now to the drawings, various embodiments of the process for forming a three-dimensional article and the apparatuses for use in carrying out the process will now be described in detail. As shown in FIG. 1, a three-dimensional object forming apparatus 10 is generally shown. The apparatus 10 comprises at least one uniform droplet formation apparatus 12, and in the embodiment shown, comprises a further droplet formation apparatus 13. It is to be understood that the uniform droplet formation apparatus can be as described in the Chun et al. U.S. Pat. No. 5,266,098, which reference is expressly incorporated herein. The uniform droplet forming apparatuses 12 and 13 are enclosed in a chamber 15 in a preferred embodiment. The chamber 15 comprises a frame 8 having a suitable transparent shroud 9. The chamber 15 encloses an inert atmosphere and prevents undesired contaminants from coming into contact with the molten metal as the three-dimensional article is being formed. However, it should be understood that in various embodiments other means for keeping contaminants away from the molten metal being deposited are within the contemplated scope of the present invention, and an alternative embodiment showing a hemispherical chamber 15' is shown in FIG. 1C.

The uniform droplet forming apparatus 12 is, in one preferred embodiment, substantially similar to the uniform droplet forming apparatus 13. For ease of explanation, one set of numerals common to elements in each uniform droplet forming apparatus 12 and 13 will be described.

The uniform droplet forming apparatus 12 and the apparatus 13 each comprise a vibrating means 16 and a crucible 18. It is to be understood that each crucible 18 has a heating means 19 to melt the deposition material 14 to a desired temperature, and a moving means 21 to move the crucible 18 in at least one, and in some embodiments, 3 directions and/or between in the X, Y and Z axes. It is to be further understood in certain embodiments, that the molten material 14 within the crucible 18 can be under a desired pressure from a pressurizing means 17. The molten material 14 in a preferred embodiment is subjected to vibrations by the vibrating means 16 at a desired amplitude and frequency. A stream or jet 28 of material 14 is formed and exits the crucible 18 from at least one orifice 20. The vibration of the stream 28 causes a plurality of droplets 36 having a substantially uniform size and shape to be formed. As the droplets 36 form, the droplets 36 pass through a charging system 22. The charging system 22 generally comprises a charging plate 24 having at least one opening 26 which is aligned with the orifice 20. The charging system 22 applies a charge to the droplets 36 as the droplets 36 are being formed. As each droplet 36 breaks from the stream 28, each droplet 36 retains a portion of the charge.

As the droplets 36 descend, the droplets 36 pass through or adjacent a focusing or alignment means 30. In the embodiment shown, the alignment means 30 can have a cylinder shape or conical shape (not shown) which is shown in cross-section for ease of illustration. The aligning means 30 comprising a charging or repelling surface 32 which defines an opening 34, as best seen in FIG. 1A. The charging or repelling surface 32 is preferably made of a highly conductive material such as copper, aluminum, steel or the like and is, in certain embodiments, about 150 to about 450 mm in length. The opening 34 is generally from about 10 to about 40 mm in diameter. It is to be understood that in other embodiments, the length and diameter of the repelling surface 32 are dependent, at least in part, on the type of material being deposited, the size of the droplets, and the ultimate shape of the three-dimensional article.

When the charging or repelling surface 32 is held at a predetermined desired voltage, the droplets 36 remain a predetermined distance from each other and from the charging or repelling surface 32. This repelling force is generally shown by the double-headed arrows 35 in FIG. 1A. As each droplet 36 descends, a leading droplet 36A is repelled, not only from a succeeding droplet 36B, but is also repelled from the sides of the charging or repelling surface 32, thereby preventing the like-charged droplets from merging with each other or scattering sideways. The droplets tend to cluster around an axis extending longitudinally through the alignment means 30. The charge on the droplets allows the droplets to be delivered in a fine, very accurate line.

It is to be understood that any suitable metal may be used depending upon the end use application. The actual charge on each droplet is a function not only of the type of metal used but also the diameter of the droplet and the diameter of the opening 34 through which the charged droplets 36 descend and the voltage between the charging or repelling plate 32 and the droplets 36. A charge on the droplets 36 on the order of $10^{-7}$ coulomb/gram is useful; however, it is to be understood that other charges are also useful and that the charges depend on the various parameters discussed above. The droplets at least partially solidify during the descent and are in a semi-liquid state at the point of impact at which the droplets reach a substrate or work station positioning system 40. As seen in FIG. 1B, as the droplet 36 cools a skin 37 is formed which shields a molten portion 39. In certain embodiments, as the droplet 36 impacts either the work station positioning system 40 or previously deposited droplets, the skin breaks open and the droplet flattens.

In preferred embodiments, at the point of impact the droplet has an optimal ratio of about 50:50 to about 20:80 and preferably 30:70 of liquid-to-solid fraction of the droplet. The optimal ratio both ensures the accurate deposition of each individual droplet and prevents too great a remelting of the target or puddling of the liquid material at the point of impact.

Referring again to FIG. 1, the work station positioning system 40 comprises a plurality of moveable means for moving a work station surface 42. A first moveable means 44 moves the work station surface 42 in a Y (forward and backward) direction as generally shown by the arrow Y on the first moving means 44. A second moveable means 46 generally moves the work station surface 42 in the X (horizontal or left and right) direction as generally shown by the arrow X shown on the moving means 46. A third moveable means 48 moves the work station in the Z (vertical or up and down) direction as generally shown by the arrow Z on the means 48. In certain embodiments, a fourth moveable means 50 generally further moves the work station positioning system 40 in the X direction between at least a first position or station and a second position or station. In the embodiment shown in FIG. 1, the first droplet forming apparatus 12 dispenses one type of molten material while the second droplet forming apparatus 13 dispenses a different type of molten material. The work station positioning system 40 is moveable between the droplet forming apparatuses 12 and 13 by the fourth moveable means 50. The work station positioning system 40 and the fourth moveable means 50 are operatively connected via a further moveable means 52 such as a pneumatic or hydraulic means to a power source (not shown) for moving the work station positioning means 40. The work station positioning system 40 and the droplet forming apparatuses 12 and 13 are operatively connected to a control means 56 having a planning system for providing instructions for movement of the work station positioning system 40 and/or operating instructions for the droplet forming apparatuses 12 and 13.

The control means 54 can preferably have a computer software program or planning system which reads a solid model representation of the object geometry and planning system sections this representation into a finite number of slices. The computer program coordinates the actuation of the work station positioning system 40 and monitors any sensor inputs such as pressure, temperature, charge, feed rate, frequency, amplitude and distances.

The method of the present invention results in the ability to produce, within a matter of hours, from scratch, a new and metal part having overhang portions directly from a CAD file. The three-dimensional article has the strength and durability properties which are favorably comparable to machined counterparts. Further, while the deposition as shown herein shows a single orifice 20, it is to be understood that multiple orifices can be utilized in the present invention depending on the geometry of the three-dimensional article being formed.

It is further contemplated that the chamber 15 can comprise a vacuum chamber to withdraw any ambient air or oxygen from the deposition chamber. It is also contemplated that other devices having, for example, a much smaller glass dome or similar container, as shown in FIG. 1C, can be used to evacuate ambient air, oxygen or the like from the deposition chamber 15 and place within the chamber an inert gas such as argon or nitrogen. The chamber can comprise a lower port 56 and an upper port 58 to allow for the injection and evacuation of inert gas and/or ambient atmosphere.

Figure 2:
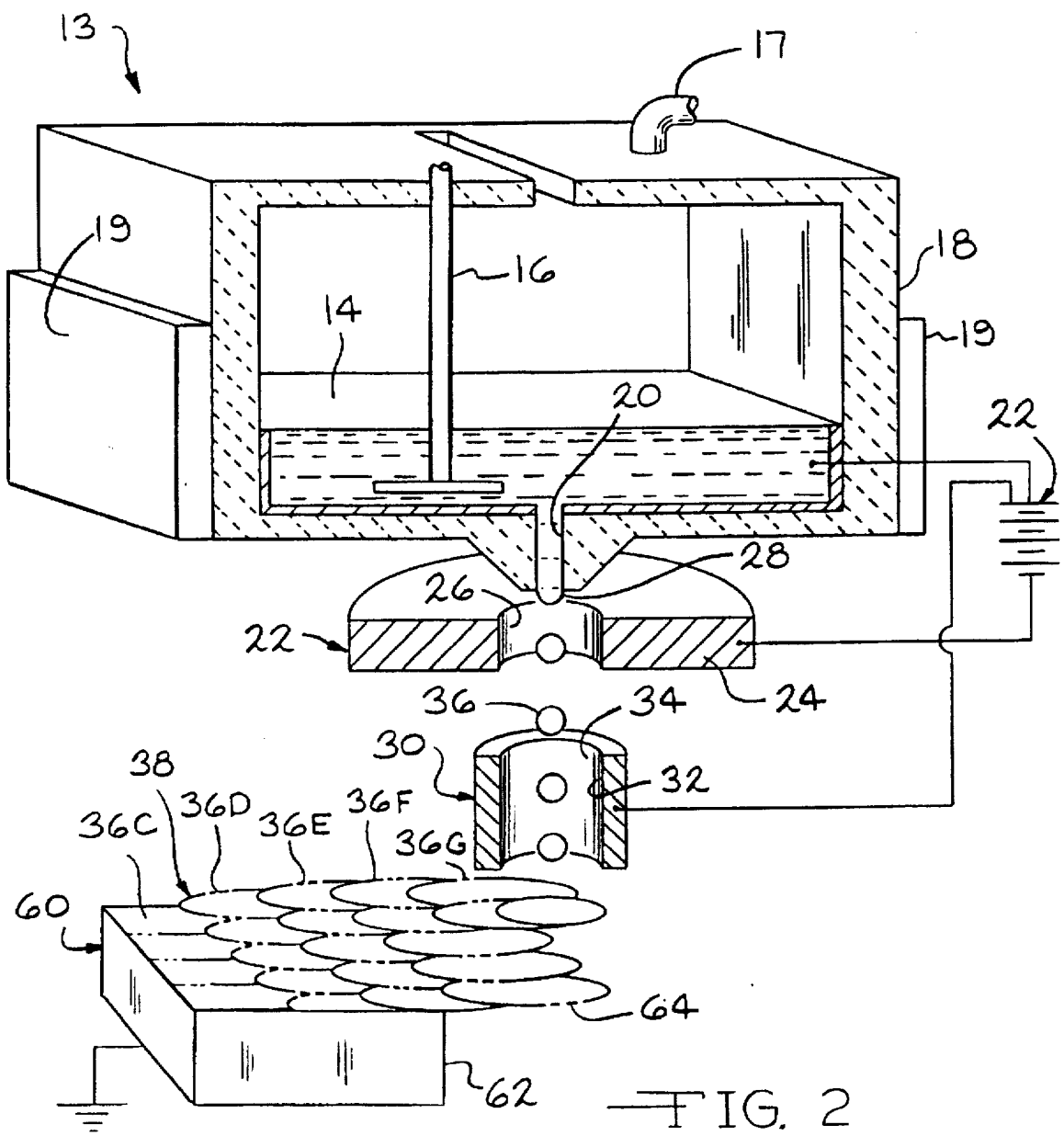
FIG. 2 is a perspective view, partially in cross-section and partially greatly enlarged, of a portion of the apparatus as shown in FIG. 1 showing one technique for depositing material and creating part overhangs.

In the embodiment shown in FIG. 1, the work station positioning system 40 is accurately moveable in at least three planes such that, as the droplets 36 are deposited in a predetermined pattern, each droplet 36 builds on preceding deposited droplets to form a new surface 38 three-dimensional article 60, as shown in FIG. 2.

The three-dimensional article 60 is generally shown as being formed of a plurality of flattened droplets 36C which form the new surface 38. As each droplet is deposited the droplets merge and form a vertical wall 62 of the article 60. In this embodiment succeeding layers of droplets 36D are formed such that the droplets overlap portions of the previously deposited droplets 36C. The succeeding droplets 36D impact on the preceding droplets 36C such that the diameter of the droplets 36D overlap the droplets 36C. In this manner, as succeeding rows of droplets 36E, 36F, 36G and so on are formed, the droplets 36D, 36E, 36F and 36G form an overhang portion generally shown as 64. As each droplet impacts the previously deposited droplets and solidifies, the overhang portion 64 is formed directly without need for any supporting substrate.

Figure 3:
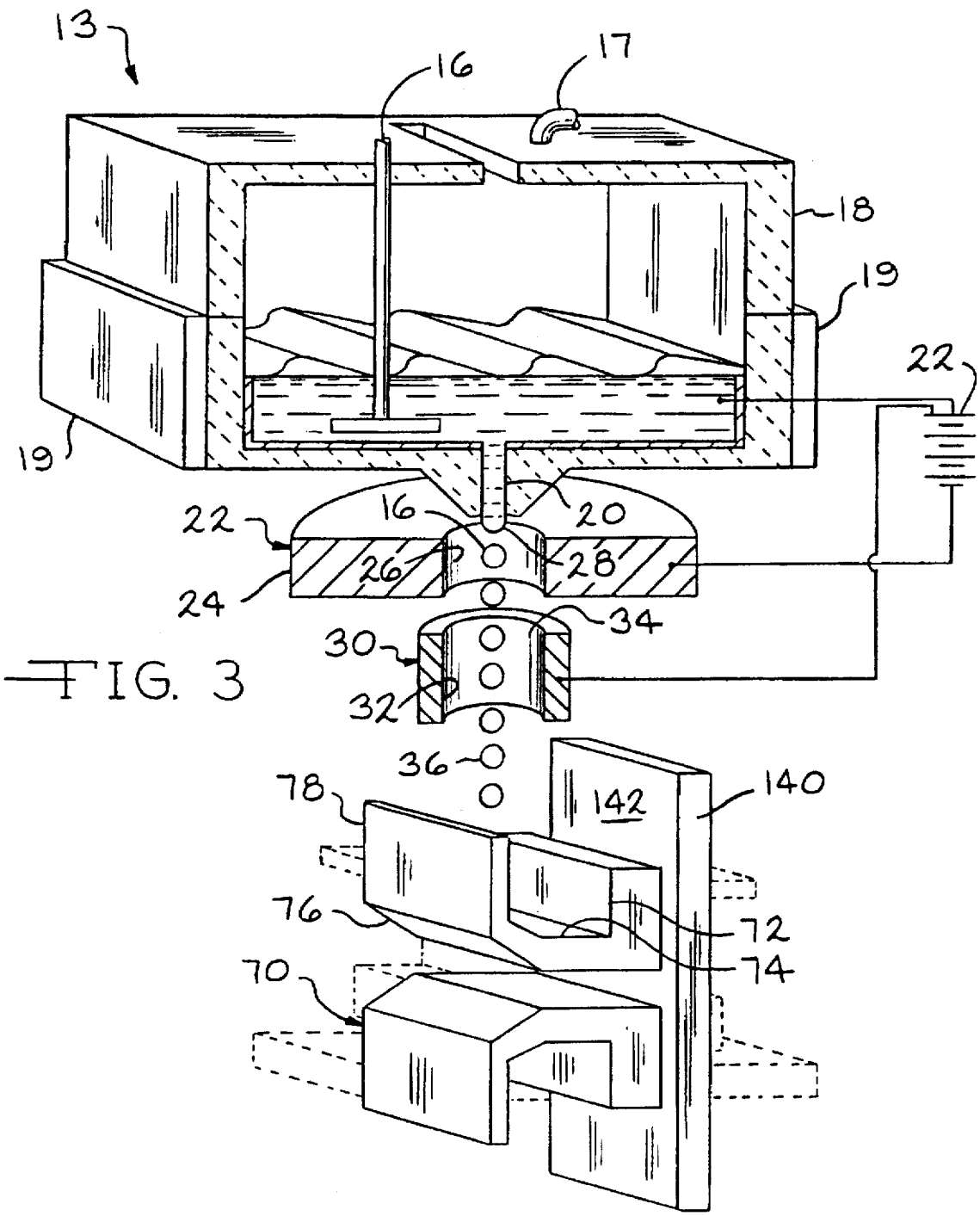
FIG. 3 is a perspective view, partially in cross-section, partially greatly enlarged and partially in phantom, of a portion of another embodiment of an apparatus for depositing molten metal to form a three-dimensional article and creating part overhangs.

FIG. 3 shows an example of another embodiment wherein a support or work station positioning system 140 having a planar surface or work station 142 is rotatable about 5 axes such that the work station 142 can be rotated in further dimensions. For example, the positioning system 140 is shown rotated into a vertical (Y) direction such that the droplets 36 can be deposited to form the complex three-dimensional shape of an article 70. It is to be understood that a first portion 72 of the article 70 can be formed while the planar surface 142 is in the substantially horizontal (X) plane. Thereafter, while the positioning means 140 is still in substantially the horizontal plane, a second portion 74 is formed where the droplets are deposited to build the second portion 74 extending at substantially a right angle from the first portion 72. Thereafter, the positioning means 140 is rotated about an axis in an X-Y plane to allow a third portion 76 of the article 70 to be formed at an angle. As is shown in FIG. 3, a fourth portion 78 of the article 70 is formed by rotating the positioning means 140 to a vertical (Y) direction such that the droplets are being deposited in a vertical manner.

Figure 4:
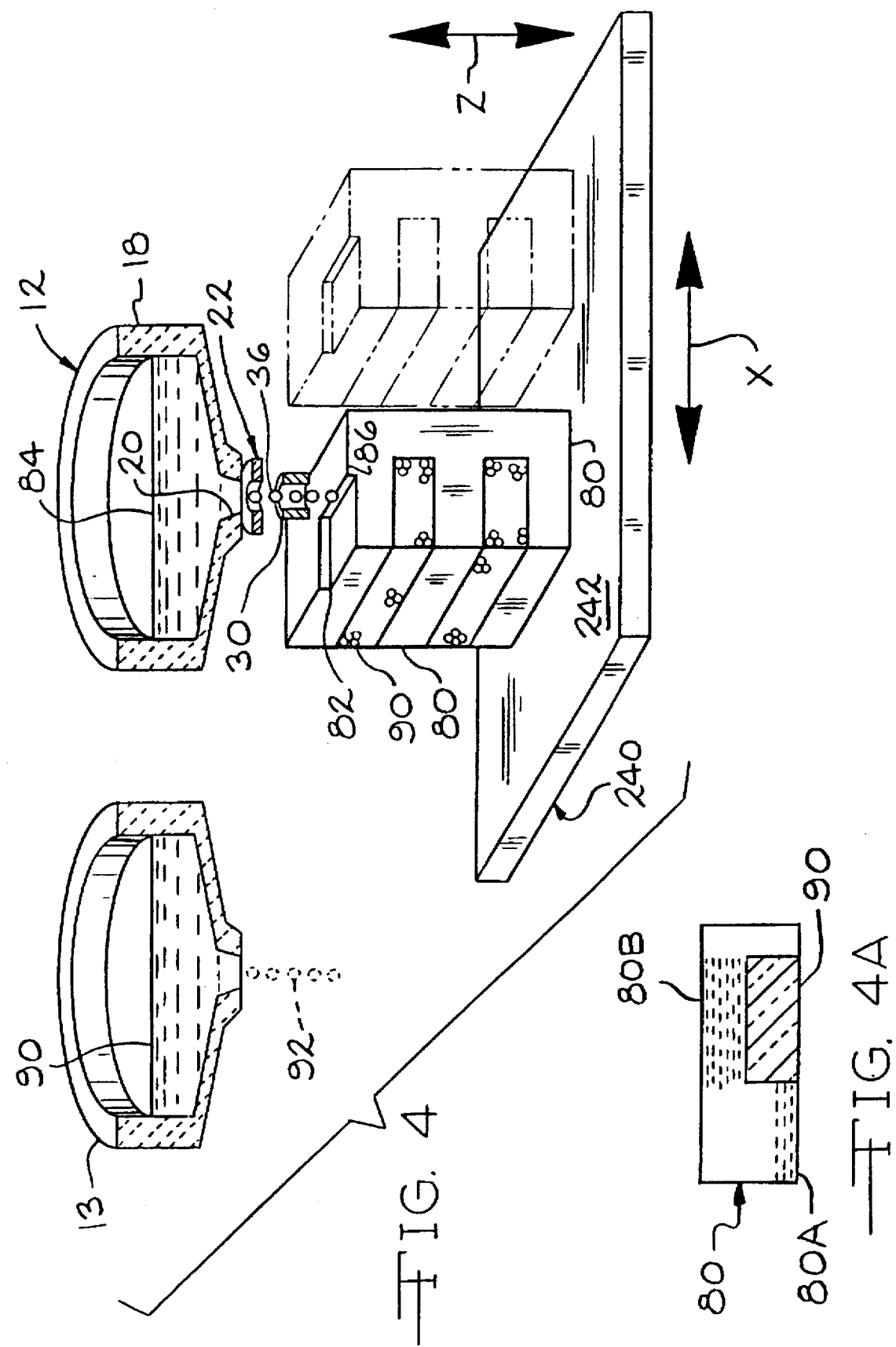
FIG. 4 is a perspective view, partially in cross-section, partially greatly enlarged and partially in phantom, showing a portion of yet another embodiment of an apparatus for depositing molten material to form a three-dimensional article and creating part overhangs.

Referring now to FIG. 4, a further three-dimensional article 80 is generally being formed on a work station positioning system 240 having a work station surface 242. The positioning system 240 is preferably moveable in at least three directions between the X, Y and Z axes. In the embodiment shown in FIG. 4, the first droplet forming means 12 deposits droplets 82 of a first material 84 onto the work station surface 242 in a predetermined manner. In the embodiment shown, the second droplet forming means 13 contains a second or support material 90 which deposits droplets 92 of the second material 90 onto or adjacent portions of the article 80 to act as a support material. As shown in FIG. 4A, the article 80 comprises a plurality of layers 80A which form a portion of the article 80. The second material 90 is deposited in areas adjacent the deposition material 80. The second material 90 then can receive additional droplets 80B which are held in a position by the second material 90. Upon completion of the three-dimensional article 80 the second material 90 can be removed by any means, as discussed above.

Figure 5:
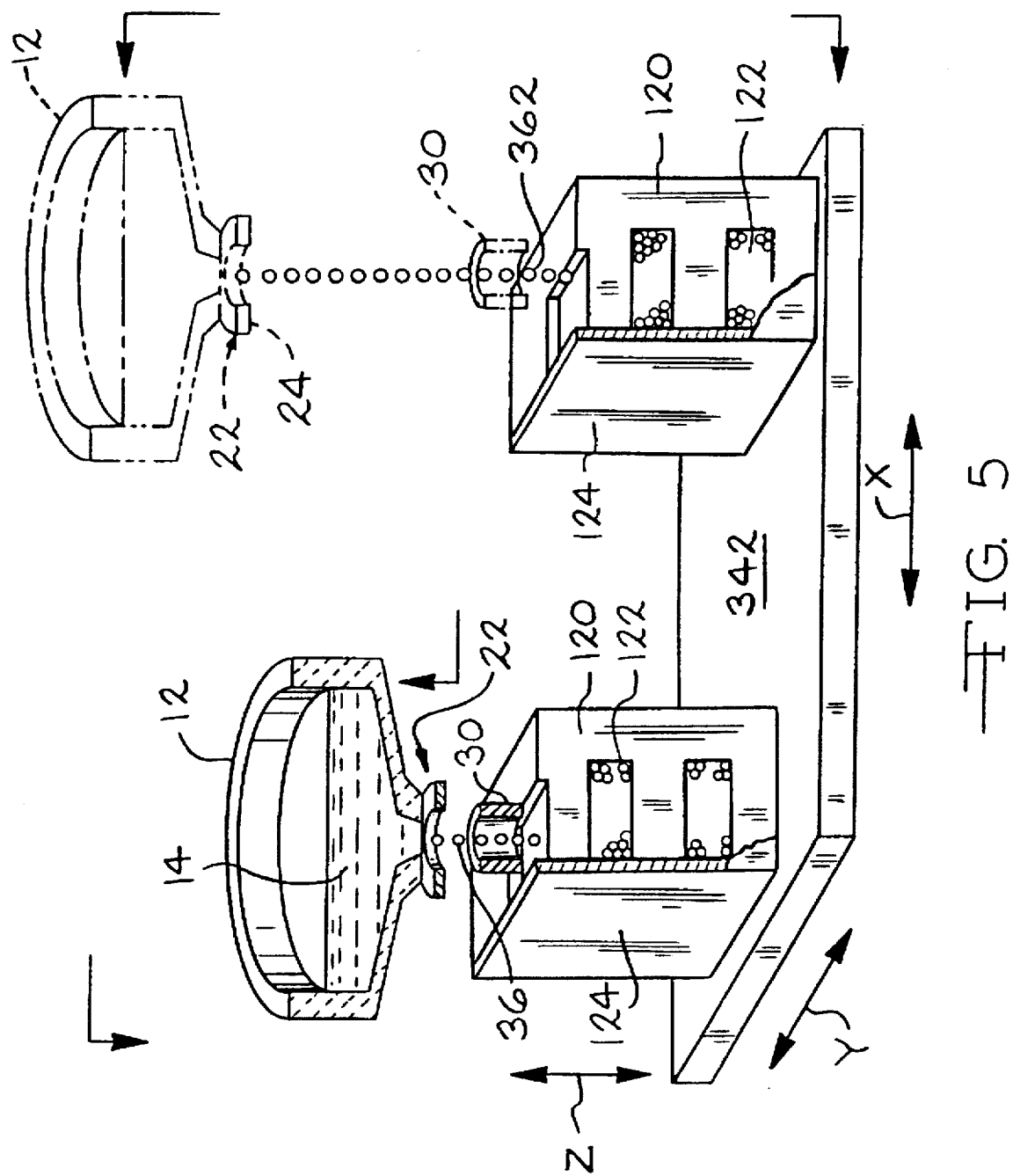
FIG. 5 is a perspective view, partially in cross-section, partially greatly enlarged and partially in phantom, showing a portion of yet another embodiment of an apparatus for depositing molten material to form a three-dimensional article and creating part overhangs.

Referring next to FIG. 5, the droplet forming means 12 can be moved in the X, Y and Z directions. The droplet forming means 12 is operatively connected to the moving means 21 and is moveable in at least a vertical or Z direction to raise the droplet forming means 12 such that the distance between the droplets forming means 12 and a work station positioning system 340 holding a three-dimensional article 120 being formed is increased. It is to be understood that the work station positioning system 340 can also be moveable in a Z or vertical direction (as shown in phantom in FIG. 5) to increase the distance between the droplet forming means 12 and the article 120 being formed. The increase in distance between the droplet forming means 12 and the droplet impact area allows a plurality of droplets 36Z to substantially solidify before impacting on the target. As the droplets 36Z are solidified, the solidified droplets 36Z form a powder particulate material 122 which acts as a support material. Upon completion of the three-dimensional article 120, the powder or support material 122 is removable from the three-dimensional article 120. The distance and the rate at which the droplets 36Z are deposited or metered is monitored such that the droplets 36Z do not form or bond onto the article 120.

In various embodiments the powder support area 122 may not retain its desired configuration in order to act as a suitable support for the part overhangs. In such situations, the powder support area 122 is preferably supported by an exterior or interior wall 124 made from the molten material 36.

Figure 6:
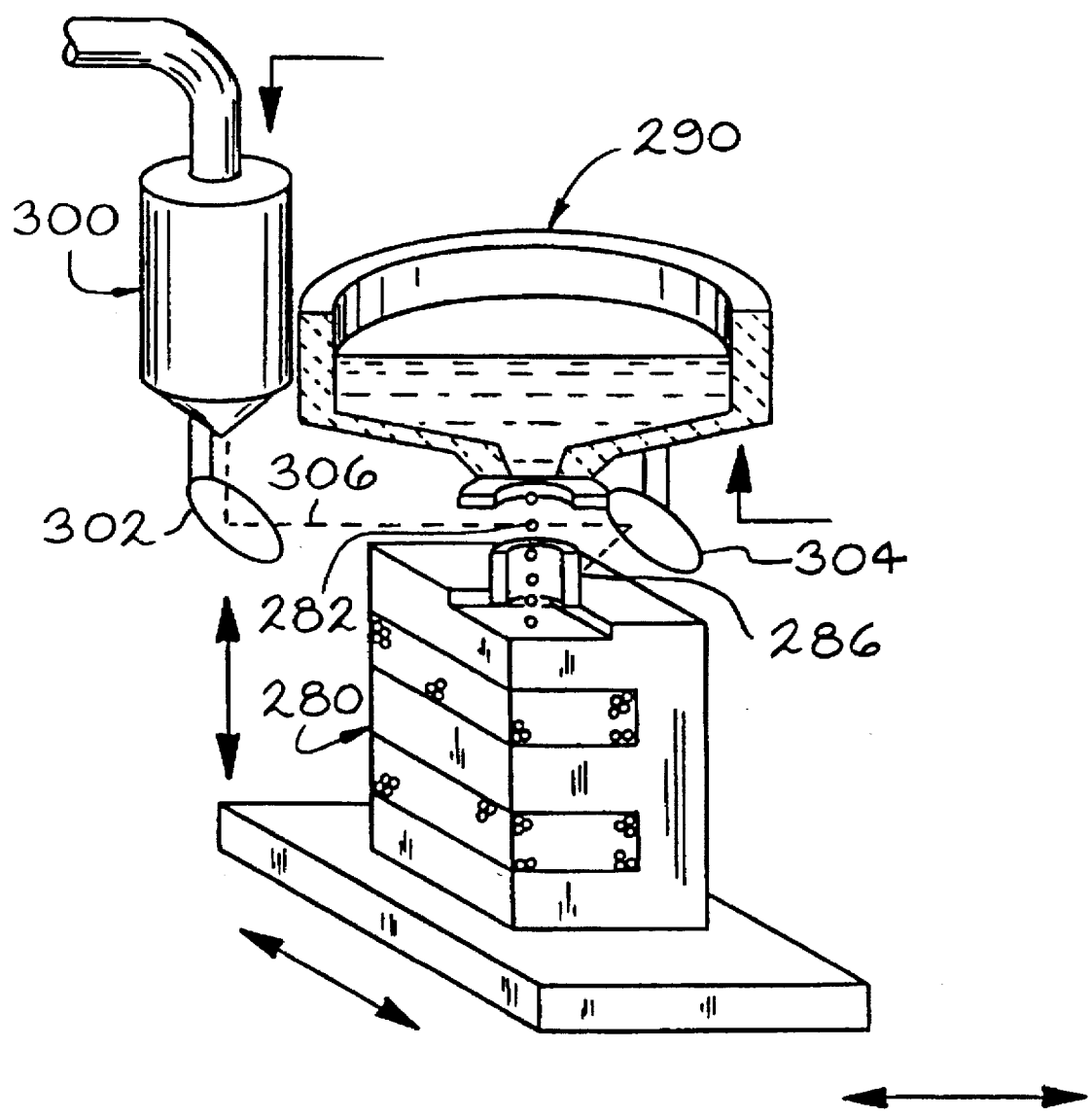
FIG. 6 is a perspective view, partially in cross-section, showing a portion of another embodiment of an apparatus for depositing molten material to form a three-dimensional article.

FIG. 6 further shows one embodiment of a means 300 for relieving stress in an article 280 being formed. It is to be understood that, while the stress relieving means 300 is shown in connection with a crucible system 290 the stress relieving means 300 can be utilized in all embodiments in the present invention and is being shown herein with one crucible system for ease of illustration. The stress relieving means 300, can comprise a source of laser energy. The stress relieving means 300 has various directing means 302 and 304 for directing a beam 306 of laser light or energy to a portion 286 of the material being deposited. The laser beam 306 relieves stress in the material 280 being simultaneously deposited and bonded to preceding deposited layers to prevent any curling, warping or other stresses from being built into the article 280. In addition, the laser beam 306 can be used to maintain a temperature control in the immediate impact area as droplets 282 are deposited on the three-dimensional article 280 being formed.

It is to be understood however, in certain embodiments, that other methods to relieve stress in each layer such as shot peening, induction heating or other annealing processes are also contemplated as being useful in the present invention.

It is also within the contemplated scope of the present invention that in another embodiment the powder particles can be formed using two droplet forming apparatuses; wherein one apparatus is positioned at a first distance from the work station positioning system such that the droplets form the three-dimensional article, and wherein the second apparatus is positioned at a second greater distance from the work station positioning system such that powder particles are formed.

According to the present invention, no further processing steps need be carried out on the finished article once the deposition process is complete. Each of the methods for forming a three-dimensional article described herein can be used to produce a three-dimensional article of any configuration, size and/or complexity.

While certain preferred embodiments have been shown and described herein, it is to be understood that the invention is not limited thereto but may be variously embodied within the scope of the following claims.

We claim:

1. A method for the accurate formation of a free-form metal three-dimensional article without the use of a mold of the three-dimensional article, the method comprising:

providing a supply of substantially uniform size molten or semi-molten metal droplets of a desired material, each droplet having the same positive or negative charge, aligning each droplet in the supply of droplets into a substantially narrow stream, the droplets being aligned by allowing the droplets to pass through at least one alignment means having the same charge as the droplets wherein the alignment means repels each droplet toward an axis extending through the alignment means, and depositing each of the aligned droplets in a predetermined pattern at a predetermined rate onto a target or a newly formed layer of the three-dimensional article to form the three-dimensional article.

2. The method of claim 1, in which the alignment means provides a continuing charge on each droplet to keep each droplet separate from adjacent droplets by maintaining the positive or negative charge on each droplet until each droplet is deposited on the target or the newly formed layer of the three-dimensional article being formed.

3. The method of claim 1, in which the droplets pass through the alignment means having a substantially cylindrical or frusto-conical shape.

4. The method of claim 1, in which the target is moveable in at least three directions.

5. The method of claim 1, in which the supply of desired material is movable in at least one direction.

6. The method of claim 1, in which the uniform size droplets are formed by vibrating a supply of the desired material at a desired frequency and/or amplitude.

7. The method of claim 1, in which the target is moveable at a desired rate relative to the supply of droplets to form the three-dimensional article.

8. The method of claim 1, in which the three-dimensional article is formed from a computer model and in which, by software, the accurate deposition of the material is guided.

9. The method of claim 1, in which the alignment and deposition of the desired material is conducted in an environment having a predetermined pressure, a predetermined temperature profile, and predetermined atmospheric conditions.

10. The method of claim 1, in which the article is formed in an inert gaseous atmosphere.

* * * * *